March 27, 1962
I. BERGER ETAL
3,027,113
SPINNING REEL
Filed March 17, 1955
2 Sheets-Sheet 1
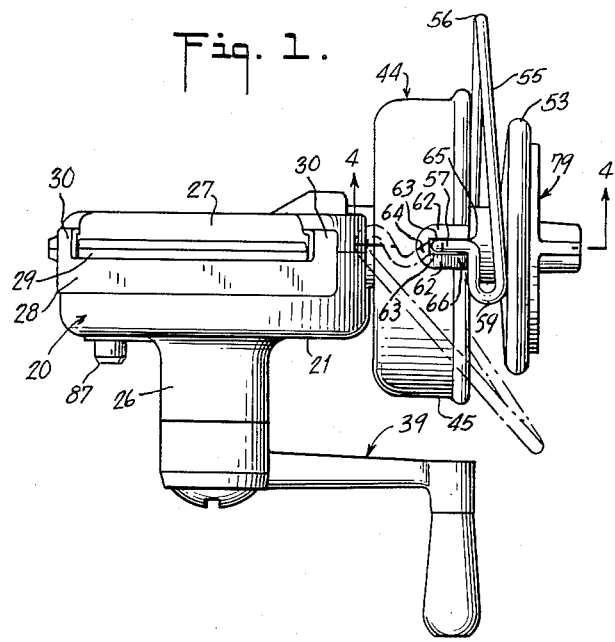
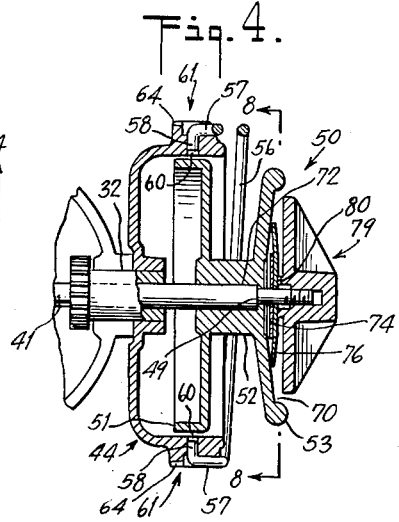
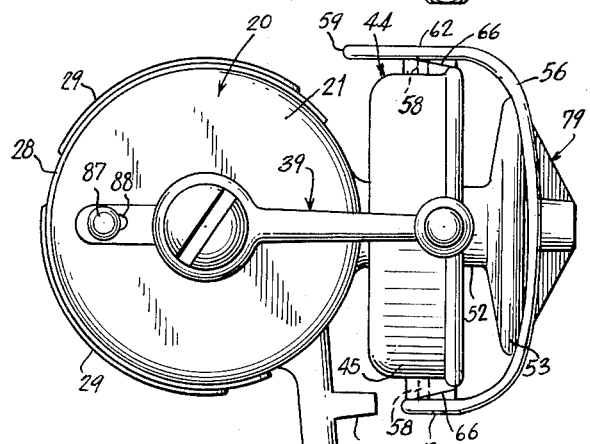
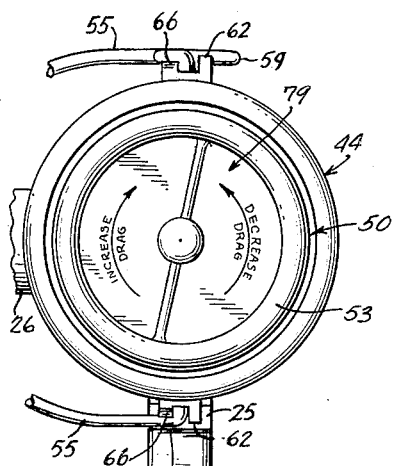
INVENTORS
IRVIN G. BERGER
PHILIP F. HALL
BY
Leo C. Krazinski
ATTORNEY

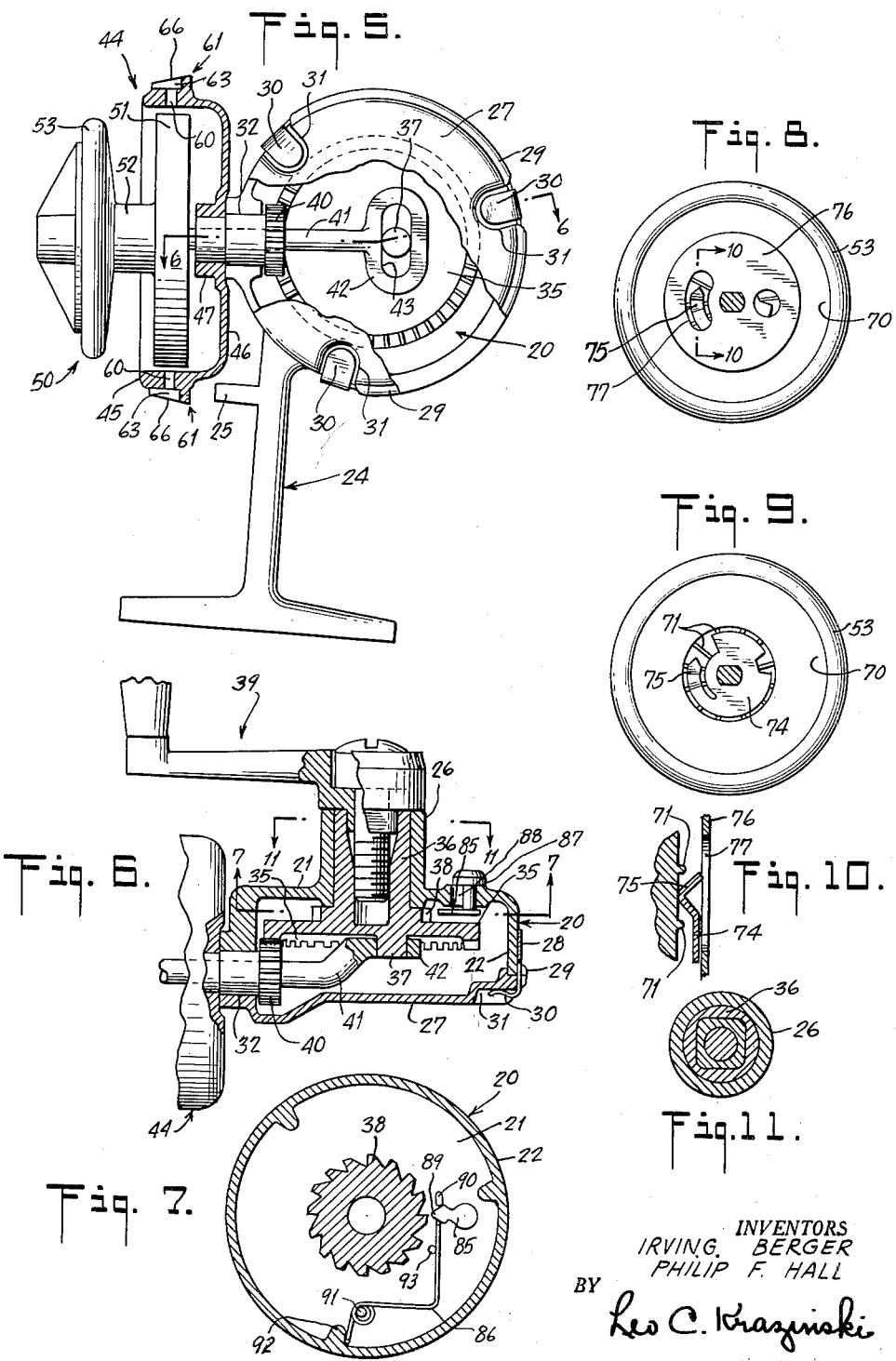

United States Patent Office 3,027,113
Patented Mar. 27, 1962

3,027,113
SPINNING REEL
Irving Berger, Bronx, N.Y., and Phillip F. Hall, Elizabeth, N.J., assignors to David Berger and Sidney Berger, doing business as Trimline Mfg. Co., Bronx, N.Y.
Filed Mar. 17, 1955, Ser. No. 494,962
1 Claim. (Cl. 242—84.21)

The present invention relates to fishing reels and, more particularly, to spinning reels of the type wherein a line carrying spool is mounted for reciprocation within a cup and the cup rotates about the spool and is provided with a bail for winding the line about the spool while the spool is reciprocated to lay the line in a manner to enable the same to be readily cast from the spool when stationary.

In recent years, reels of the foregoing type have become quite popular because of the ease with which casting can be performed, even by inexperienced fishermen. However, the popularity and full exploitation of such reels have been limited because they have been comparatively expensive and could not be afforded by a great number of persons. Such cost was primarily caused by their intricate design and complicated assembly which involved high manufacturing, assembly and material costs and the employment of highly skilled labor.

Accordingly, the primary object of the present invention is to provide a spinning reel of the type indicated herein which is extremely simple in design, is formed of a minimum number of parts adapted to be readily manufactured and assembled, and is economical to produce at a selling price within reach of most every person's purse, but yet is rugged in construction and reliable in operation.

Another object is to provide an automatic device for returning the bail into its line engaging position.

Other and further objects will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIG. 1 is a plan view of a reel in accordance with the present invention, as seen from the top when the reel is mounted on a fishing rod extending from left to right, the bail being shown in line engaging position in full lines and in line disengaging position in broken lines;

FIG. 2 is a side elevational view of the reel as seen from the crank side, the bail being shown in line disengaging position;

FIG. 3 is an end view of the reel, as seen facing the spool, the bail being shown in line disengaging position;

FIG. 4 is a sectional view taken through the line 4—4 on FIG. 1;

FIG. 5 is a side view of the reel, as seen from the side opposite the crank, partly in elevation and partly in section;

FIG. 6 is a sectional view taken substantially along the line 6—6 on FIG. 5;

FIG. 7 is a sectional view taken along the line 7—7 on FIG. 6;

FIG. 8 is a sectional view taken along the line 8—8 on FIG. 4, illustrating a drag mechanism for the spool;

FIG. 9 is a view similar to FIG. 8 with an element of the drag mechanism removed;

FIG. 10 is a sectional view taken along the line 10—10 on FIG. 8; and

FIG. 11 is a sectional view taken along the line 11—11 on FIG. 6.

Referring to the drawings in detail and, more particularly to FIGS. 1 to 6 thereof, a spinning reel is shown which essentially comprises a main housing, a line carrying spool, a cup having a bail thereon for laying the line on the spool, drive mechanism for rotating the cup and reciprocating the spool, means for moving the bail from line disengaging position into line engaging position upon operation of the drive mechanism, cup anti-reversing click mechanism, as shown in FIG. 7, and spool rotation restraining or drag mechanism, as shown in FIGS. 8 to 10.

The main housing comprises a generally circular casing 20 having a closed end defined by a wall 21, an open end and a side wall 22; and a supporting arm or bracket 24 formed integral with the casing 20 and adapted for attachment to a reel seat of a fishing rod (not shown) and having a lateral projection 25 thereon, the purpose of which will be described in connection with the bail moving means.

As shown in FIGS. 1, 2, and 6, the closed end wall 21 has a central, tubular collar 26 projecting outwardly therefrom, and a cover 27 is provided for closing the open end of the casing which is removably secured thereto by a partly circular strap 28 adapted to surround a portion of the side wall 22 of the casing with its upper edge abutting a nib 29 or equivalent stop means on the side wall and having spring tabs 30 adapted to fit into recesses 31 in the cover to clamp the same on the casing. The side wall of the casing and the cover have radial semi-cylindrical surfaces cooperating to provide a bearing 32 for an element of the cup rotating mechanism, as shown in FIGS. 4, 5 and 6.

The drive mechanism comprises a crown gear 35 within the casing (FIGS. 5 and 6) having a sleeve 36 mounted for rotation in the casing collar 26, an eccentric pin 37 within the gear teeth and a ratchet 38 between the sleeve and the side of the gear opposite its teeth provided with a bearing surface engaging the inner side of the wall 21; a crank or handle 39 arbored and secured in the gear sleeve 36 (FIGS. 6 and 11); a centrally bored pinion gear 40 mounted for rotation in the bearing 32 and meshing with the crown gear (FIGS. 5 and 6) to be rotated thereby; and a main shaft 41 extending through the pinion gear bore formed with a head 42 having a slot 43 for receiving the pin 37 (FIGS. 5 and 6) to effect reciprocation of the main shaft.

The cup, shown as a shallow member 44, has a circular side wall 45 and an end wall 46 formed with an internal collar 47 for securing the hub of the pinion gear 40 therein (FIGS. 5 and 6).

A spool 50 is mounted on a shoulder 49 adjacent the free end of the shaft 41 (FIG. 4) for reciprocation therewith and to rotate about the shaft, but is restrained against such rotation by a drag device described hereinafter. The spool comprises a base flange 51 disposed within the cup 44, a line receiving spindle 52 and a line retaining flange 53 formed with a smooth, rounded periphery to facilitate letting off the line, when the spool is stationary (FIGS. 4 and 5).

In order to wind the line on the spool 50, the cup 44 is provided with a bail or flier 55 which comprises an arcuate central section 56, a leg 57 at each end substantially perpendicular thereto, a pivot portion 58 on each leg substantially perpendicular thereto and facing radially inwardly towards each other, and an extension or loop 59 between the central section and one of the legs extending substantially tangentially beyond its adjacent leg (FIGS. 1 to 4).

The bail is pivotally mounted on the cup to extend partially about the open end at one side thereof in a plane substantially perpendicular to the axis of rotation of the cup, when in line engaging position (FIGS. 1 and 4), and to extend partially about the other side of the cup in a plane diagonal to the cup, when in line disengaging position (FIGS. 1, 2 and 3). This is accomplished by mounting the pivot portions 58 in diametrically opposite apertures 60 formed in the cup wall 45 adjacent its open end (FIGS. 4 and 5) and providing a lug formation 61 about the apertures about to be described.

In accordance with the invention, the lug formations 61 each comprises a pair of spaced, radially projecting rib sections 62 defining a slot 63 therebetween which extends across the aperture 60 in a radial plane through the cup and is open at the open end of the cup and is shallow at its other end to provide a notch 64. One of the rib sections is formed with an abutment or stop 65 at the open end of the slot and the other rib section is formed with an inclined outer face or cam 66 merging with the rim of the cup and protruding outwardly towards the notch 64 (FIGS. 1 to 5).

When the bail is in line engaging position (FIGS. 1 and 4), the end of the arcuate section opposite the loop 59 abuts the stop 65, and the legs 57 are disposed in the slots 63 and are retained by the ribs 62. When the bail is in line disengaging position (FIGS. 2 and 3), the legs 57 are biased in the notches 64 to retain the bail in this position and the loop is positioned to move in a circular path blocked by the projection 25. Thus, when the crank is turned to rotate the cup and bail in a direction to retrieve and wind the line about the spool, the extension 59 strikes the projection 25 and causes the legs 57 to be sprung out of the notches 64, whereupon the cams 66 bias the legs into the slots 63 to automatically flip the bail into its line engaging position.

The drag device for the spool is housed within a circular recess 70 in the face of the flange 53 (FIGS. 4, 8, 9 and 10) which has radial ribs 71 adjacent a stepped central bore 72 through which the reduced free end of the shaft 41 protrudes. A disc 74 (FIG. 9) is arbored on the shaft and is formed with a spring tooth 75 (FIG. 10) for gripping one of the ribs 71, and a second disc 76 (FIG. 8) is arbored on the shaft and has a slot 77 for receiving the tooth 75 to prevent interfering with the movement thereof. The disc 76 has a shallow curvature as seen in FIG. 4, to provide spring action and to extend over the disc 74 with its periphery in engagement with the face of the flange recess 70. A knob 79 is threaded on the free end of the shaft 41 (FIG. 4) and is formed with a central circular rib 80 for engaging the disc 76 and pressing the same against the face of the flange recess 70 and the disc 74.

When the knob is fully secured, the spool is locked on the shaft by the tooth and rib arrangement and the friction of the disc 76 bearing on the flange face. When the knob is released slightly, the disc 76 disengages the disc 74 to allow the tooth 75 to ride over the ribs 71 but still frictionally engages the flange face to restrain the spool against rotation. By further releasing the knob in varying degrees, the restraint or drag on the spool can be decreased gradually to a freely rotatable relation between the spool and the shaft.

The click device is provided by the ratchet 38, a pawl 85 (FIGS. 6 and 7) and a spring 86. The pawl is mounted on a button 87 slidably disposed in a radial slot 88 in the casing wall 21 and has an arrow shaped tooth 89 at its free end adapted to slide between a free end portion of the spring 86 and a guide protuberance 90. The spring 86 is coiled about a pin 91 on the interior of the wall 21 (FIG. 7) with one end portion in engagement with a stop 92 and adjacent its other end portion abutting a stop 93. Movement of the button 87 and tooth 85 to the left, as seen in FIG. 7, places the tooth in mesh engagement with the ratchet 38, so that upon rotation of the ratchet clockwise the tooth 89 is rotated counterclockwise, hereby compressing spring 86, until free of a ratchet tooth, whereupon the spring snaps the tooth 89 against the protuberance 90 to produce an audible click.

From the foregoing description, it will be seen that the present invention provides a simple, economical and practical spinning reel of the type described which is reliable in operation and can withstand such rough usage to which it may normally be subjected.

As various changes may be made in the form, construction, and arrangement of the parts herein, without departing from the spirit and scope of the invention and without sacrificing any of its advantages, it is to be understood that all matters are to be interpreted as illustraive and not in any limiting sense.

What is claimed is:

In a casting reel having a main housing and a line carrying spool on the housing, the combination therewith of a supporting bracket and a cup on the housing, a lateral projection on said bracket, a line engaging bail pivotally mounted on said cup, said bail comprising an arcuate section, a leg at each end of said arcuate section substantially perpendicular thereto, a loop extension between one of said legs and said arcuate section, a pivot portion on each of said legs substantially perpendicular thereto and facing inwardly with respect to said cup, and a pair of oppositely disposed lugs on said cup each having an aperture for receiving said pivot portions, each of said lugs comprising a pair of spaced radially projecting ribs arranged substantially parallel to the axis of the cup to provide a slot therebetween, each of said slots extending across said apertures and each of said slots being open at its end facing the open end of the cup to receive one of said legs for retaining said bail in its line engaging position, one of said ribs having a projecting face at a higher elevation than that of the other rib, whereby a notch is formed at a juncture of the ribs opposite the open end of the slot for receiving one of said legs to retain said bail in its line disengaging position and whereby an abutment is formed adjacent the open end of the cup by said one rib, and the other rib having a projecting face that slopes downwardly from said juncture towards the open end of the cup, whereby a cam surface is formed so that as said bail is rotated said loop extension strikes said lateral projection and biases the bail from its line disengaging to its line engaging position.

References Cited in the file of this patent

UNITED STATES PATENTS

| | | |
|---|---|---|
| 1,053,871 | Purdom | Feb. 18, 1913 |
| 2,495,621 | Young et al. | Jan. 24, 1950 |
| 2,558,896 | Young et al. | July 3, 1951 |
| 2,690,309 | Cuonz et al. | Sept. 28, 1954 |
| 2,705,113 | Bonanno | Mar. 29, 1955 |
| 2,712,419 | Martini | July 5, 1955 |
| 2,726,052 | Pons | Dec. 6, 1955 |
| 2,728,535 | Young | Dec. 27, 1955 |
| 2,762,579 | Mauborgne | Sept. 11, 1956 |
| 2,766,956 | Sarah | Oct. 16, 1956 |
| 2,771,253 | Mauborgne | Nov. 20, 1956 |
| 2,775,417 | Freund | Dec. 25, 1956 |
| 2,776,803 | Shakespeare et al. | Jan. 8, 1957 |
| 2,777,645 | Wood | Jan. 15, 1957 |

FOREIGN PATENTS

| | | |
|---|---|---|
| 471,218 | Great Britain | Aug. 31, 1937 |
| 1,008,291 | France | Feb. 13, 1952 |